United States Patent
Cox et al.

(10) Patent No.: US 7,369,290 B1
(45) Date of Patent: May 6, 2008

(54) MODULATOR BIAS CONTROL

(75) Inventors: Charles H. Cox, Carlisle, MA (US); Edward I. Ackerman, Cambridge, MA (US)

(73) Assignee: Photonic Systems, Inc., Burlington, MA (US)

( * ) Notice: Subject to any disclaimer, the term of this patent is extended or adjusted under 35 U.S.C. 154(b) by 55 days.

(21) Appl. No.: 10/392,321

(22) Filed: Mar. 19, 2003

(51) Int. Cl.
*G02B 26/00* (2006.01)

(52) U.S. Cl. ............... 359/239; 359/238; 359/307

(58) Field of Classification Search ........... 359/239
See application file for complete search history.

(56) References Cited

U.S. PATENT DOCUMENTS

| | | | |
|---|---|---|---|
| 3,988,704 A | 10/1976 | Rice et al. ............ 359/250 |
| 4,162,398 A | 7/1979 | Kayanuma ............ 250/205 |
| 4,306,142 A | 12/1981 | Watanabe et al. ...... 250/201.1 |
| 4,460,249 A | 7/1984 | Vincent ............... 359/276 |
| 5,208,817 A | 5/1993 | Kao et al. ............. 372/26 |
| 5,343,324 A | 8/1994 | Le et al. ............. 398/198 |
| 5,400,417 A | 3/1995 | Allie et al. ........... 305/2 |
| 5,495,359 A | 2/1996 | Gertel et al. .......... 359/245 |
| 5,629,792 A | 5/1997 | Masaki ............... 359/245 |
| 5,646,771 A | 7/1997 | Noda ................. 359/245 |
| 5,726,794 A | 3/1998 | Tajima ............... 359/249 |
| 5,805,328 A | 9/1998 | Satoh et al. ........... 359/245 |
| 5,900,621 A | 5/1999 | Nagakubo et al. ...... 250/205 |
| 5,907,426 A | 5/1999 | Kato et al. ........... 359/239 |
| 6,046,838 A | 4/2000 | Kou et al. ............ 359/245 |
| 6,479,979 B1 * | 11/2002 | Kingsley et al. ........ 324/96 |
| 6,762,869 B2 * | 7/2004 | Maleki et al. .......... 359/239 |
| 6,879,422 B2 * | 4/2005 | Notargiacomo et al. ... 359/245 |
| 6,917,455 B2 * | 7/2005 | McBrien et al. ........ 359/238 |
| 2003/0112487 A1 * | 6/2003 | Fuller et al. .......... 359/239 |

FOREIGN PATENT DOCUMENTS

| | | |
|---|---|---|
| EP | 0 448 832 A2 | 10/1991 |
| EP | 0 448 832 A3 | 10/1991 |
| EP | 0 565 306 A1 | 10/1993 |
| EP | 1 005 182 A1 | 5/2000 |
| EP | 0 768 765 A1 | 1/2003 |
| JP | 62255916 | 11/1987 |
| JP | 4294318 | 10/1992 |
| WO | WO 98/28659 | 7/1998 |

OTHER PUBLICATIONS

Ackerman, Edward et al, "Maximum Dynamic Range Operation of a Microwave External Modulation fiber-Optic Link", IEEE Transactions on Microwave Theory and Techniques, vol. 41, No. 8, Aug. 1993, pp. 1299-1306.

(Continued)

*Primary Examiner*—Jessica T Stultz
(74) *Attorney, Agent, or Firm*—Kristofer E. Elbing

(57) ABSTRACT

Approaches to bias control are disclosed for an optical modulator that modulates an optical carrier with a data input signal. In one embodiment an electrical bias input signal provided to the modulator is adjusted based on a characteristic of the data input signal detected from the modulated optical output signal. Another embodiment injects an additive dither signal into an optical modulator receiving a data input signal having a modulation depth of at least on the order of 50%. These embodiments can obtain and maintain a correct bias point on a modulator's transfer function curve when the modulation signal has a modulation depth on the order of 100%.

33 Claims, 12 Drawing Sheets

OTHER PUBLICATIONS

Cox, Charles III et al., "Techniques and Performance of Intensity-Modulation Direct-Detection Analog Optical Links", IEEE Transactions on Microwave Theory and Techniques, vol. 45, No. 8, Aug. 1997, pp. 1375-1383.

Farina, Joseph P. and McBrien, Gregory J., "Design Guide for Bias Control for External Modulators Used in Digital Data Transmission Applications", Uniphase Corporation, Bloomfield, CT, believed to be at least as early as Apr. 21, 2002, pp. 1-18.

Farwell, Mark L. et al., "Increased Linear Dynamic Range by Low Biasing the Mach-Zehnder Modulator", IEEE Photonics Technology Letters, vol. 5, No. 7, Jul. 1993, pp. 779-782.

JDS Uniphase Electro-optic Products Division, "Bias Control for Digital Data Modulators", application note, believed to be at least as early as Apr. 20, 2001, pp. 1-10.

* cited by examiner

MODULATOR BIAS CONTROL

FIELD OF THE INVENTION

This invention relates to the bias control of optical modulators.

BACKGROUND OF THE INVENTION

One method for imposing an electrical signal onto an optical carrier is to use an external modulator. Examples of external modulators presently in use include Mach-Zehnder (MZ) and electro-absorption (EA) types. In most cases, pyroelectric, photorefractive and photoconductive effects in the device material of a modulator (often lithium niobate, or a semiconductor like GaAs, or an electro-optic polymer) can cause its output power-vs-input voltage characteristic (i.e., its transfer function) to change or "drift," over time or temperature. The result of drift is that a specific DC bias voltage (or even 0 Volts) may, for example, yield a minimum point on the transfer function curve at one time, but yield a different point on the curve at a later time and/or at a different temperature. This situation is illustrated in FIG. 1 for a digital application of a Mach-Zehnder type of external modulator in which the same digital electrical input signal produces two very different optical output signals, depending on the location of the operating point on the modulator transfer function.

There have been many attempts either to eliminate the drift problem through better modulator design or to circumvent it through the use of auxiliary circuits that maintain a fixed bias point. Since it appears that there has not been a commercially viable solution using the former approach, the use of bias controllers that implement the latter approach has become the standard method for dealing with the modulator drift problem.

Many prior art methods for maintaining a specific bias point have assumed a Mach-Zehnder modulator. The modulation transfer function of an MZ modulator is such that the intensity of light passing through it varies in a sinusoidal fashion to the applied voltage, as shown in FIG. 2. The magnitude of the control voltage change required to transition from a maximum (or minimum) to a minimum (or maximum) is generally stable; and is known as the switching voltage (often designated as $V_\pi$). It can be measured for each individual modulator and will have a fixed value. The four most commonly utilized DC operating bias points for the MZ modulator are known (by their relationship to the output Intensity) as the maximum ('Max'), minimum ('Min'), or one of two half-way points ('Quad +' and 'Quad −', depending on whether the intensity is increasing or decreasing with increasing applied voltage).

FIG. 3 shows a representative EA modulator transfer function. While the output optical intensity from interferometric modulators like the MZ type vary periodically with voltage, the EA modulator transitions only once between "on" (minimum optical absorption) and "off" (maximum absorption) when the voltage is changed by a magnitude $V_s$. Therefore there is no "Quad +" bias point for an EA modulator.

The most common approach to measuring the operating bias point is to apply a small, low-frequency signal to the modulator. Such a signal is referred to as a dither signal, because it dithers or perturbs the operating bias point. By measuring the optical modulation that results from applying these perturbations—and knowing the functional form of the modulator transfer function—it is possible to determine the present operating bias point. For example, at the principal points on a modulator's transfer function curve—i.e., the maximum, quadrature, and null points—the signal amplitude at either the fundamental frequency (or frequencies) of a dither signal or second-order distortion products of this signal is minimized.

FIG. 4 shows a prior art dither-based modulator bias controller. Along with a variable DC bias voltage, the controller applies a periodic, low-frequency, small-amplitude dither signal to the MZ modulator electrodes. A small fraction of the optical output of the modulator is diverted to a detector in the bias control circuit, and the output of this detector is routed through a filter. The filter rejects all frequencies other than the frequency of the dither signal required for controlling the desired bias point. The feedback circuitry continually adjusts the DC bias to the modulator to minimize the level of the signal that is passed through the filter.

These prior art methods for controlling the bias point on an optical modulator are believed to fail to effectively maintain an optimum bias point when a large modulation signal is applied to the modulator, as is the case in digital telecommunication applications. Unlike these prior art methods, embodiments according to the invention described in this application can obtain and maintain the correct bias point on a modulator's transfer function curve when the modulation signal has a modulation depth on the order of 100% (e.g., when the peak-to-peak voltage of a digital modulation signal is on the order of the modulator's on-to-off switching voltage).

SUMMARY OF THE INVENTION

This invention relates to the bias control of optical modulators, and several aspects of this invention are presented in this application.

Bias controllers and bias control methods according to the invention may be advantageous in that they can allow for straightforward implementations that maintain lock on a bias point when a large modulation signal—on the order of 100% modulation depth ($V_\pi$ for an MZ or $V_s$ for an EA modulator)—is applied to the modulator. This is particularly advantageous in telecommunications systems because system designers can obtain the best bit error rate when the amplitude of the modulation signal equals the switching voltage of the modulator.

Systems according to the invention may also be advantageous in that they allow for control of these high-modulation depth signals without any dither signals, or with a dither signal that does not have any substantial impact on the spectral characteristics of the modulated output signal. These properties can ensure that the modulator bias process has minimum adverse consequences on the data signal being modulated.

DETAILED DESCRIPTION OF AN ILLUSTRATIVE EMBODIMENT

Figure 6:
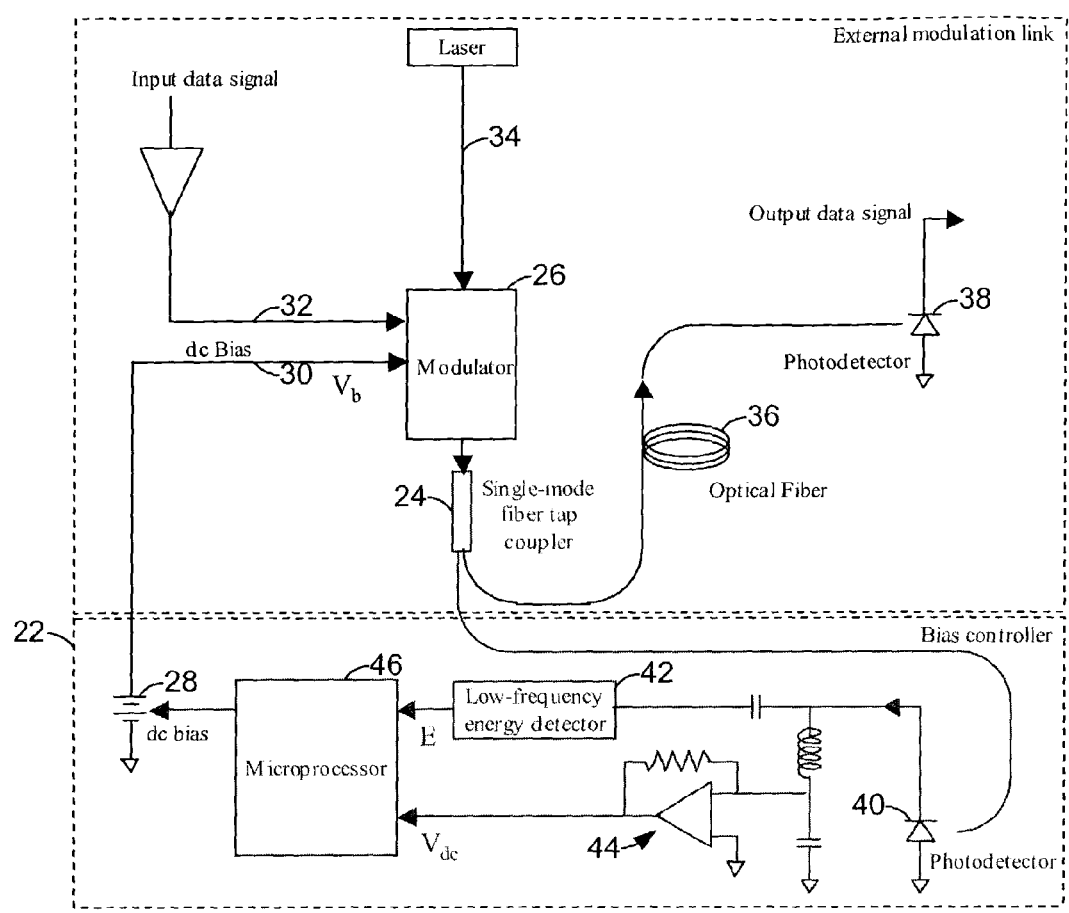
FIG. 6 is a block diagram of a first embodiment of a modulator bias control system according to the invention.

Referring to FIG. 6, a modulation bias control system 20 according to one aspect of the invention can include a bias controller 22 having an input operatively connected to one of the outputs of a single-mode fiber tap coupler 24 at the output of a modulator 26. The bias controller has an output operatively connected to an adjustable direct current (DC) bias source 28. An output 30 of the bias source is operatively connected to a bias input of the modulator, which is also operatively connected to a data signal input 32 and an output of a source of optical energy 34, such as a laser. The second output of the coupler can be operatively connected via a communications channel, such as an optical fiber 36, to a remote destination, such as a remote photodetector 38.

The bias controller can include a photodetector 40 followed by a low frequency energy detector 42 and an optional low-pass filter 44 (to provide information about the average optical power out of the modulator, which is useful in this illustrative embodiment). The low frequency energy detector can be a low frequency peak detector, and its output is operatively connected to a sample input of a microprocessor 46. The low-pass filter is also operatively connected to the output of the photodetector, and has an output operatively connected to a DC voltage input of the microprocessor. The microprocessor has an output operatively connected to an input of the adjustable bias source.

The modulation bias control system advantageously uses the data signal itself as the basis for a measurement of the operating bias point. For example if the operator decides to stabilize on the quadrature bias point, then this is the bias point at which a given electrical data modulation signal produces the maximum modulated optical signal. Therefore a bias controller that seeks to adjust the modulator bias such that the maximum modulated optical signal is produced can maintain control of a highly desirable bias point. When seeking to stabilize on a null or maximum transmission point of a Mach-Zehnder modulator, one could still use the data signal as the measure of the operating bias point, but the feedback loop is of a minimum-seeking type. Using the data signal as the basis for determining the operating bias point, means there is no need for a dither signal. This can relieve a concern that system users may have that the dither can interfere with or distort the data signal. In a digital telecommunications application such interference or distortion could increase the bit-error rate, which is a highly undesirable consequence.

Such a controller differs from prior art controllers in that it is a maximum seeking controller, as opposed to a minimum seeking controller. It is important to point out that this feature of seeking the maximum is not restricted to Mach-Zehnder modulators. One could track the maximum-swing operating point of an electro-absorption (EA) modulator, for example, which has a modulation transfer function much different from the sinusoidal transfer function of a Mach-Zehnder modulator.

An important and special class of modulation waveforms is digital data. It is an often overlooked fact that digital data waveforms—even ones with very high data rates (e.g. 10 Gbps or 40 Gbps)—contain significant spectral energy at frequencies 100-1000 times lower than the bit rate. For example, a 10 Gbps digital data stream can have spectral components below 100 MHz (if the data is random or at least non-repeating within a span of $2^7$ bits)-a factor if 100 lower than the data rate.

A beneficial insight is that computing the characteristic on a portion of the frequency spectrum produces identical results to computing the characteristics on the entire spectrum. This realization means that in the preferred embodiment an energy detector that has a frequency response (i.e. the characteristic of the modulation) that only extends to 300 MHz, may be sufficient for stabilizing the modulator's bias point with 10 Gbit/s digital data.

In operation, a portion of the modulated output from the modulator 26 is fed to a photodetector 40, which can be a low frequency photodetector. The method of accessing a portion of the modulator's output can be via a component external to the modulator, such as the tap 24 shown in FIG. 6. Alternatively, the detector 40 can be placed directly on the end of the modulator 26, thereby capturing some of the modulated light that is not coupled into the output fiber. The output of the photodetector is amplified and fed to the low-frequency energy detector 42, which measures the energy or power in the modulated signal. This detector is preferably a Root-Mean-Square (RMS) detector, but it could also be another type of energy detector, such as a square-law detector, a peak-to-peak detector, a peak detector, or an envelope detector.

The output of the energy detector is fed to a circuit or device that is capable of determining if the energy or peak has increased or decreased from the previous value and adjusting the modulator bias so as to maintain the maximum from the detector. This device is preferably a digital microprocessor, although it may also be possible to implement the device with analog circuitry. An analog-to-digital (ADC) converter digitizes the output of the energy or peak detector and a digital-to-analog converter (DAC) converts the microprocessor output to produce a modulator DC bias voltage signal. When these components are combined with the appropriate coding of the microprocessor, a feedback loop is established that tracks the modulator bias point that produces the largest signal, if one is stabilizing on a quadrature point (suitable for any type of modulator), or the smallest signal, if one is stabilizing on a null or maximum transmission point (suitable for a Mach-Zehnder modulator).

For a Mach-Zehnder type of electro-optic modulator, at the quadrature bias points the output of the energy detector is a maximum, and conversely at the maximum and minimum points the output of the energy detector is a minimum. But there is no distinction between the energy peaks at the positive- or negative-slope quadrature points, and similarly no distinction between the energy nulls at the maximum or minimum. The system therefore requires some auxiliary information to distinguish these two cases.

One way of providing this information to the bias controller is to require that the user perform measurements and input the information into the microprocessor. Another way of obtaining this information would be for a routine in the bias control process to sweep through the full range of the transfer function, in the absence of a modulating signal, in very small increments and recording the measured optical power. This allows the subsequent bias point search algorithm to specify a quadrature bias point on either the rising (+) or falling (−) slope of the transfer function curve (or specify either a maximum or minimum point on the transfer function curve). The DC bias voltage sweep also allows determination of an MZ modulator's $V_\pi$ (the absolute value of the difference between the voltage at which the optical power is maximum and the voltage at which it is minimum), which is an important parameter in an MZ modulator.

Rather than continually perturbing the bias voltage to maintain a point at which the energy detector's output is maximum (for quadrature operation, or minimum for operation at the maximum or minimum points on the transfer function), in the preferred embodiment the energy is measured continually and the bias voltage is incremented or decremented only when the energy has changed from a previously measured value by more than a certain percentage. An appropriate magnitude of this voltage increment or decrement can only be set after the modulator's $V_\pi$ is known (at least to within some range).

Figure 7:
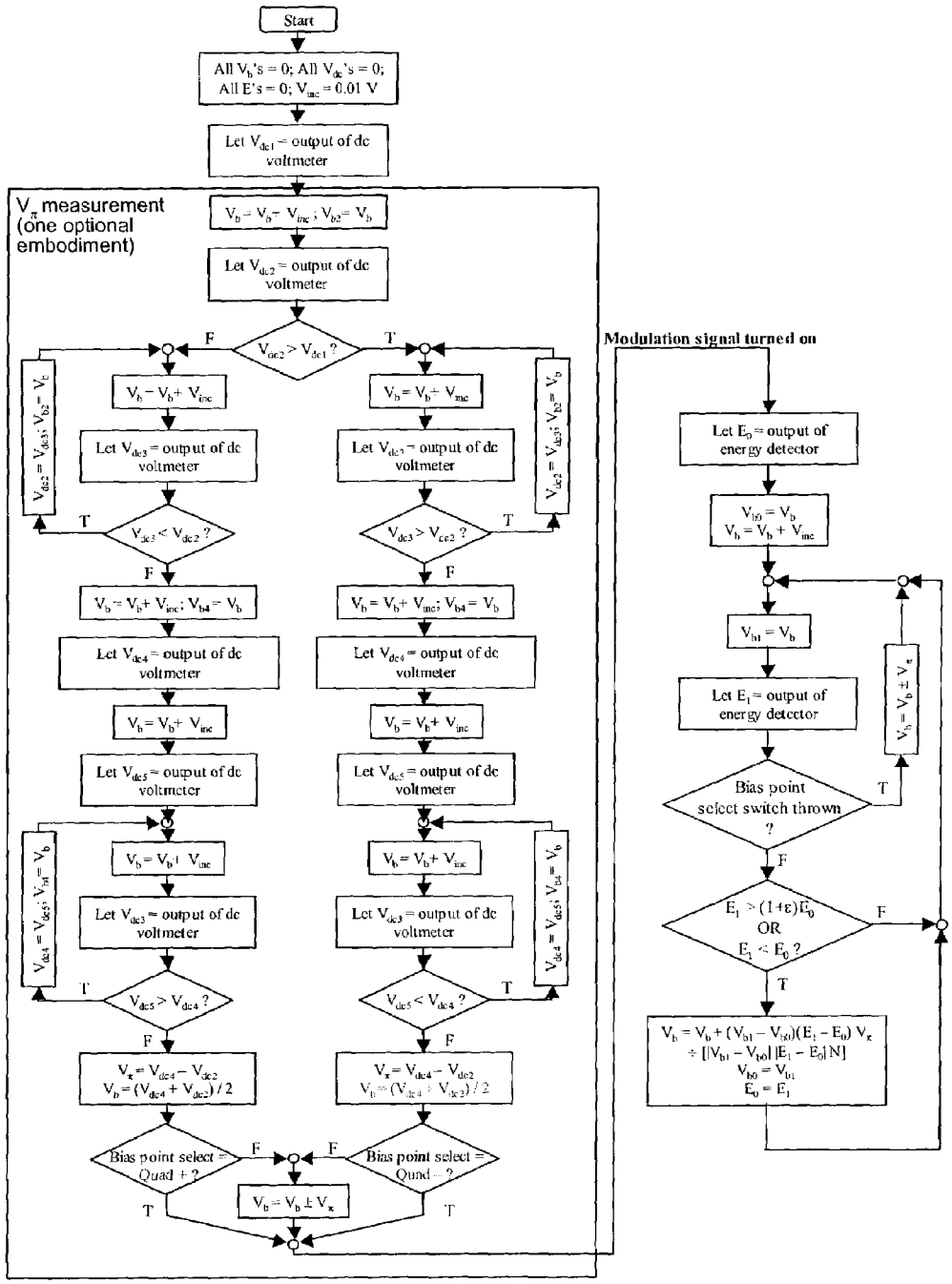
FIG. 7 is a flowchart illustrating a series of control steps for use with the system of FIG. 6 to maintain either a positive or negative quadrature bias point, as selected by the user.
Figure 8:
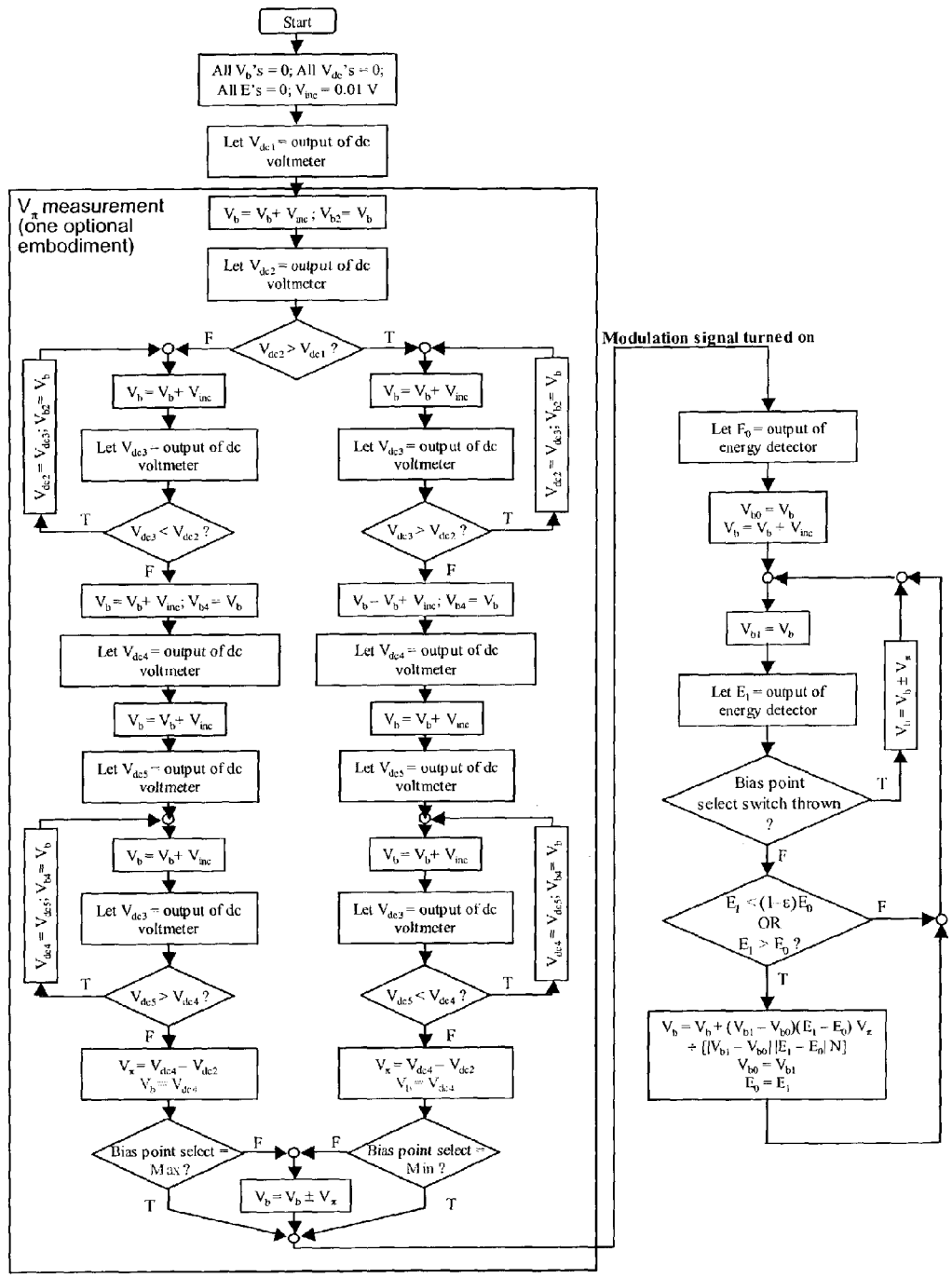
FIG. 8 is a flowchart illustrating a series of control steps for use with the system of FIG. 6 to maintain either a maximum or minimum point on the modulator transfer function curve, as selected by the user.

The steps performed to locate and maintain a quadrature bias point are shown in FIG. 7. After the DC bias voltage has been swept through its full range in the absence of a modulating signal as outlined above, the bias voltages corresponding to a maximum and an adjacent minimum on the transfer function curve are noted. The absolute value of the difference between these two voltages is equal to the modulator's $V_\pi$, the sign of this difference determines the slope of the transfer function, and the halfway point between the two voltages is proximate to one of the quadrature bias points. Because the DC voltage was swept in discrete steps, there is a quantization error to both $V_\pi$ and the quadrature bias voltage. The steps performed to locate and maintain a bias point corresponding to a maximum or minimum on an MZ modulator's transfer function curve are shown in FIG. 8.

Figure 4:
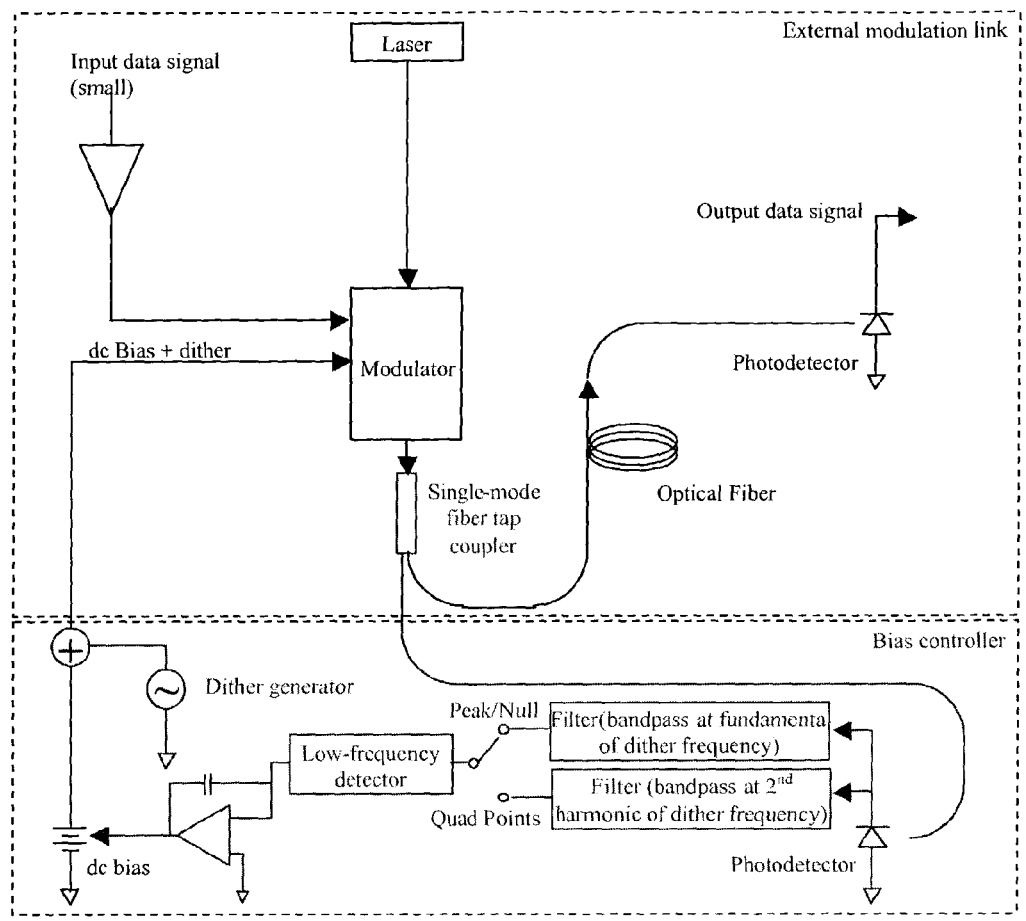
FIG. 4 is a block diagram illustrating a prior art method of maintaining the quadrature bias point on an MZ modulator's transfer function by continuously adjusting its DC bias voltage to minimize the energy detected at frequencies that are second-order distortion products of the input dither frequency or frequencies added to the DC bias and applied to a modulator electrode.
Figure 9:
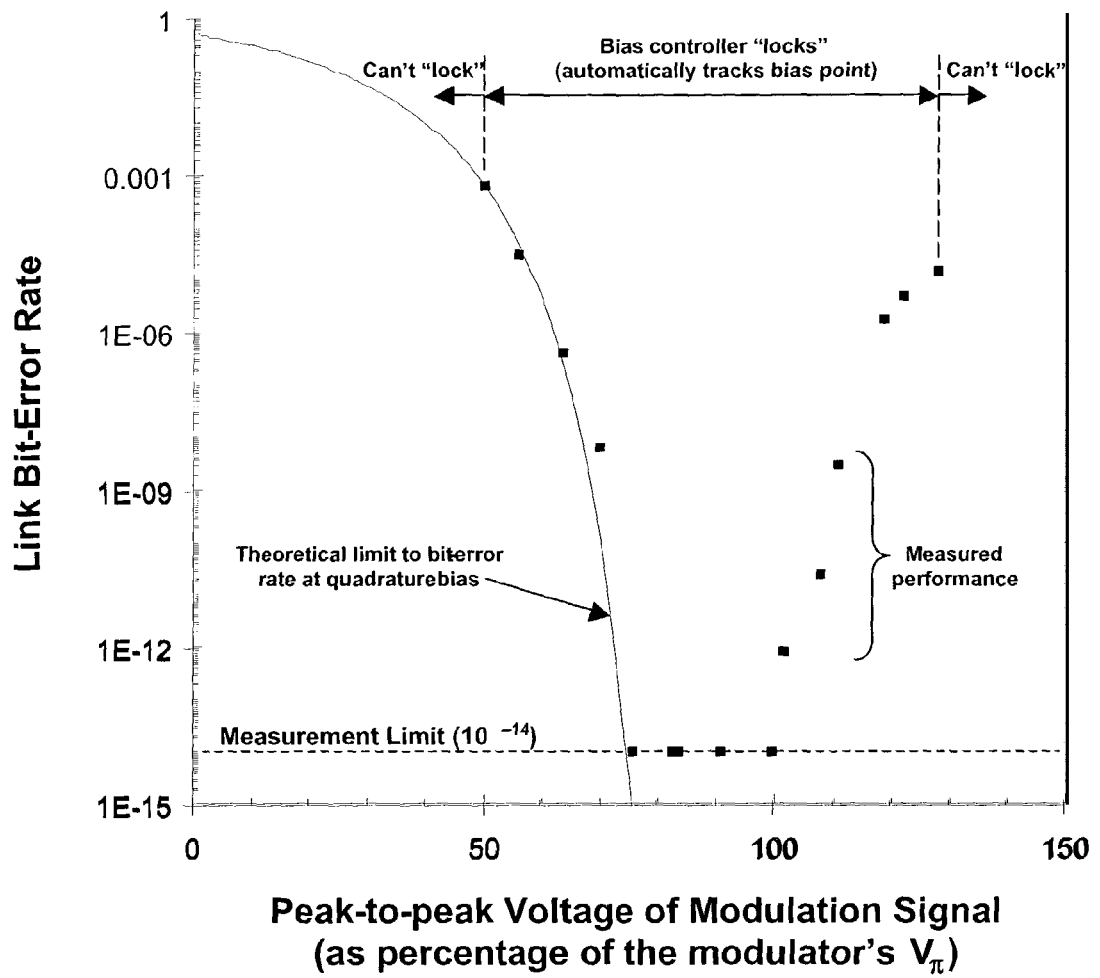
FIG. 9 is a plot showing a link's measured bit-error rate when the MZ modulator in the link was controlled using the method presented in connection with FIG. 6 under the quadrature bias routine presented in connection with FIG. 7, as the modulation depth of the input data signal was varied.

As has been discussed above, an important requirement of a bias controller is that it maintain the desired bias point while a large signal is applied to the modulator. FIG. 9 shows the results of an experimental measurement of the bit-error rate of a link that included an MZ modulator maintained at a quadrature bias point using the method shown in FIGS. 6 and 7. The bias controller maintains a "lock" on a bias point as the peak-to-peak voltage amplitude of the modulation signal is varied from a depth of 50% to nearly 130% of the modulator's $V_\pi$. Comparing the measured data (points) to the solid curve that shows the best bit-error rate possible at the quadrature bias point as a function of signal modulation depth, it is evident that the "locked" bias point must be very near to the quadrature bias point. Two phenomena limit the extent to which theory and experiment can be effectively compared in this case: 1) for signal amplitudes between ~75% and 100% of $V_\pi$, the measured bit-error rate was below the minimum bit-error rate that could be measured (i.e., $10^{-14}$), and; 2) for signal amplitudes >100% it is very difficult to predict the best theoretical bit-error rate one can achieve, because in addition to a decreased one-to-zero ratio the "overshoot" results in distortion of the rising and falling edges in the bitstream (as opposed to signal amplitudes <100% of $V_\pi$ an whose "undershoot" merely results in decreased one-to-zero ratio Another approach to modulation bias control will now be discussed. The photocurrent induced by the optical signal illuminating the detector in the prior art modulator bias controller circuitry shown in FIG. 4 is:

$$i_D = \frac{S_D P_{opt}}{2}[1 + \cos(\phi)], \qquad (1)$$

where $S_D$ is the photodetector's responsivity, $P_{opt}$ is the optical power illuminating the detector when the modulator is biased at a peak point on its transfer function curve, and φ is the phase difference between the optical signals in the two arms of the MZ modulator.

Assume that there is no data modulation signal applied to the modulator. In this case 0 is the sum of only two phase differences—one due to the applied electrical DC bias $$\phi_B = \frac{\pi V_B}{V_\pi} \qquad (2)$$

and one due to an applied small-amplitude electrical dither signal (in this example, a simple sinusoidal dither at a single frequency $\omega_d$)

$$\phi_d = \frac{\pi v_d \sin(\omega_d t)}{V_\pi}. \qquad (3)$$

Substituting Equations (2) and (3) for 0 in Equation (1), expanding out the cos(a+b) and using the small angle approximations for sin(x)~x and cos(x)~1−x²/2, it is apparent that the fundamental and second harmonic of the dither depend upon the DC bias, $\phi_B$, as follows:

$$|i_D(\omega_d)| \propto S_D P_{opt} \phi_d |\sin(\phi_B)|; \qquad (4)$$

$$|i_D(2\omega_d)| \propto S_D P_{opt} \phi_d^2 |\cos(\phi_B)|. \qquad (4)$$

Figure 1:
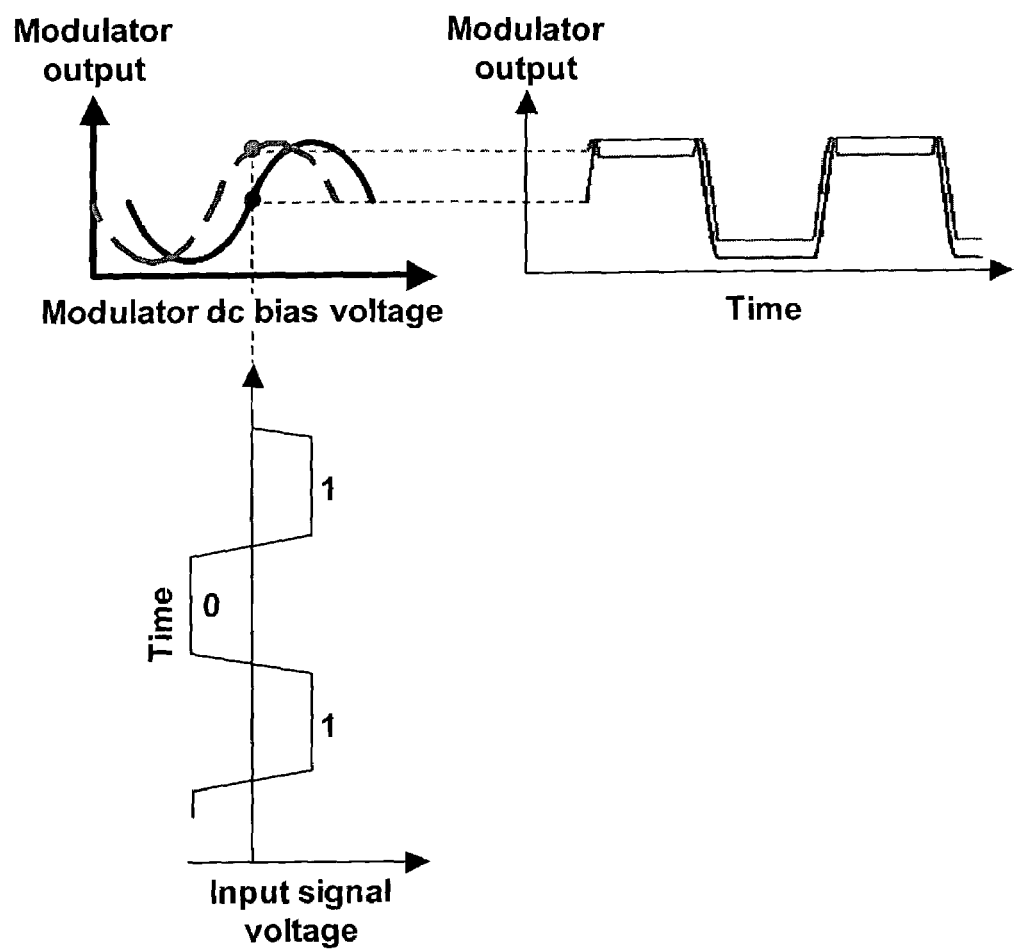
FIG. 1 is a signal diagram illustrating the effect of modulator bias point drift in a prior art modulator without automatic bias control.
Figure 2:
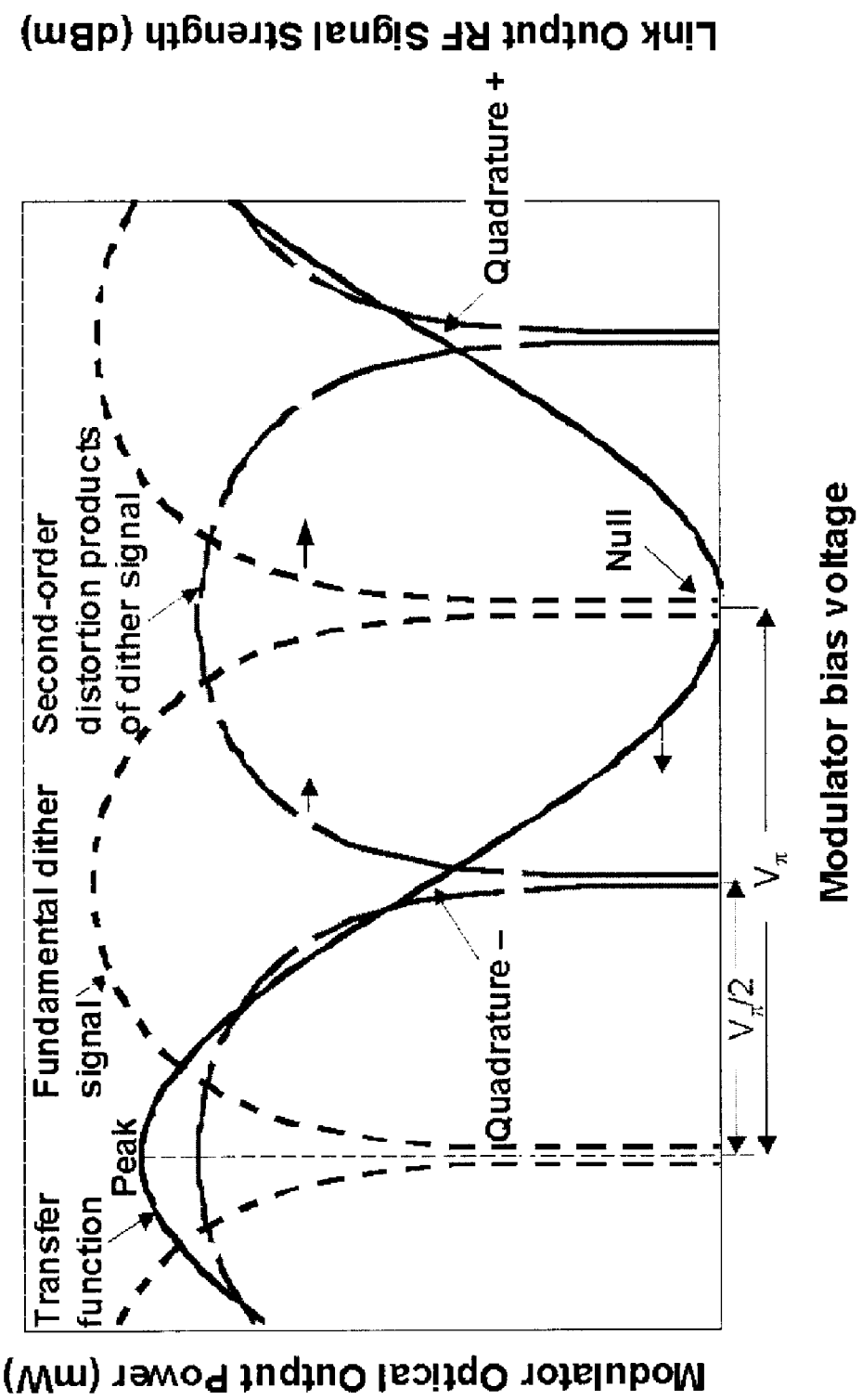
FIG. 2 is a plot showing an MZ modulator's transfer function (solid curve) and its link output power vs. DC bias voltage at frequencies corresponding to the dither signal's fundamental and second-order distortion products (dotted and dashed curves, respectively) assuming that a single-frequency sine wave dither is the only time-varying electrical signal applied to the modulator input.
Figure 3:
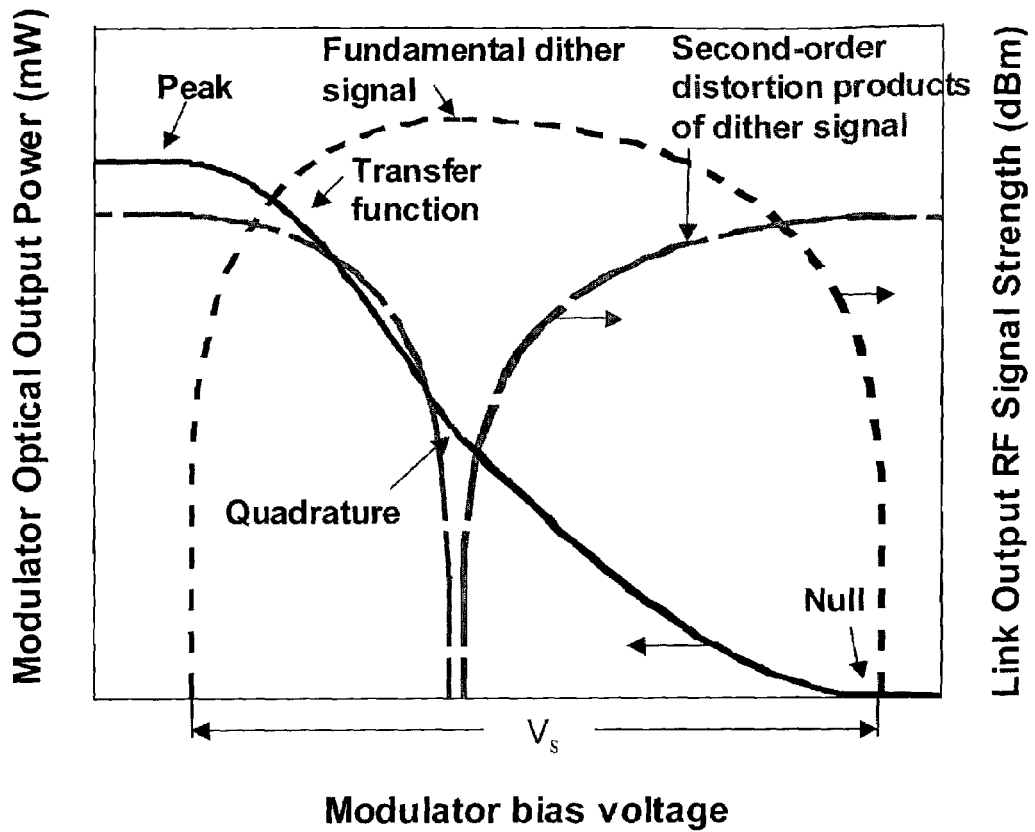
FIG. 3 is a plot showing an EA modulator's transfer function (solid curve) and its link output power vs. DC bias voltage at frequencies corresponding to the dither signal's fundamental and second-order distortion products (dotted and dashed curves, respectively) assuming that a single-frequency sine wave dither is the only time-varying electrical signal applied to the modulator input.

Equation (4) confirms that a dither-based controller, with negligible data modulation signal, will lock on to the bias point that minimizes the amplitude of the dither's fundamental, $\omega_d$, when $\phi_B \approx 0 \pm n \times 180°$, which corresponds to a null or a peak, as shown in FIG. 2, because $\sin(\phi_B)=\sin(0°)=0$. Equation (5) confirms that prior art bias controllers which use feedback circuits to minimize the amplitude of a detected second-order distortion product, $2\omega_d$, of the dither frequency will find a quadrature bias point (i.e., $\phi_B=90°\pm n\times 180°$, where n is an integer), since $\cos(\phi_B)=\cos(90°)=0$.

However a bias controller that works only when there is no data modulation present is of no value in controlling the bias when a large modulation signal is applied to the modulator—which is the case in digital telecommunication applications. Consequently, considerable effort has gone into attempts to find a solution to this problem.

Figure 5:
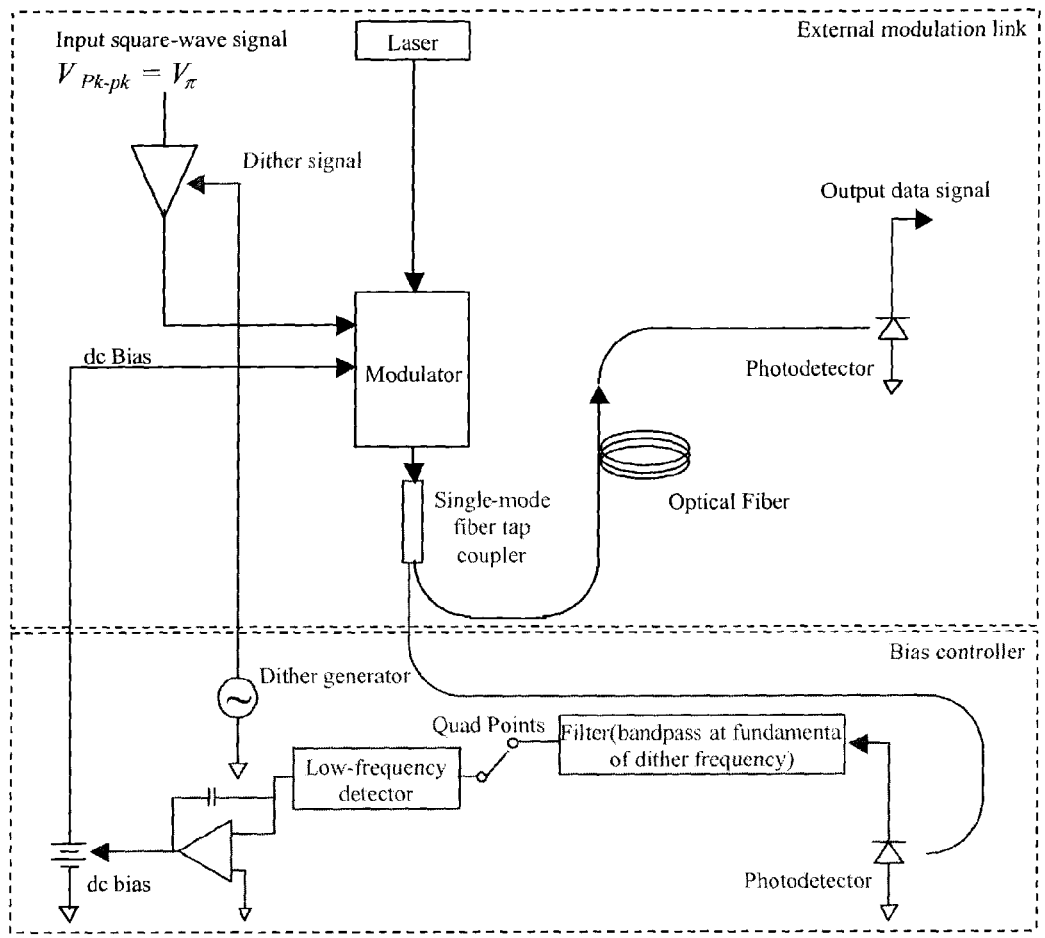
FIG. 5 is a block diagram illustrating a prior art method of maintaining the quadrature bias point on an MZ modulator's transfer function by continuously adjusting its DC bias voltage to minimize the energy detected at frequencies that are second-order distortion products of the input dither frequency or frequencies applied to the gain control port of its driver amplifier.

By far the most common prior art solution that has been used commercially is shown in FIG. 5. This is basically the prior art bias controller of FIG. 4, but with the dither signal applied such that it varies the amplitude of the data signal emerging from a driver amplifier. It can be shown that this approach does produce a detectable dither at the modulator output which can in turn be used to close a bias control loop as before.

The prior art bias controller of FIG. 5 appears to have at least three significant disadvantages relative to the invention taught here. One is that it may require a more complex—and therefore more costly—modulator driver amplifier (i.e., one with an input for a signal that permits automatic gain control). Second, its dither frequency should be below the lowest-frequency component in the data spectrum. With larger bit patterns this can mean impractically low dither frequency. And third, the dither can increase the bit-error rate, which is clearly undesirable. However, as the following simple analysis shows, there is a solution to this problem that has apparently been overlooked despite the efforts of numerous researchers over the last 15 years.

The effect of a large square-wave digital signal applied to the modulator can also be explained mathematically as follows. Under square-wave modulation with peak voltage $V_{peak}$, an additional phase difference of $\pm\phi_s$ appears in the cosine argument of Equation (1). Consequently instead of equations (4) and (5), the total detected energies at the dither fundamental and second harmonic frequencies are dependent on the bias $\phi_s$ as follows:

$$|i_D(\omega_d)| \propto S_D P_{opt} \phi_d (|\sin(\phi_B+\phi_s)|+|\sin(\phi_B-\phi_s)|); \quad (6)$$

$$|i_D(2\omega_d)| \propto S_D P_{opt} \phi_d^2 (|\cos(\phi_B+\phi_s)|+|\cos(\phi_B-\phi_s)|). \quad (7)$$

The absolute value operations in these equations are meant to express the idea that the square-wave modulation affects the bias point by either $+\phi_s$ or $-\phi_s$ at any given instant, and the bias controller circuit (which has a bandwidth much less than the modulating square-wave signal bandwidth) sees the sum of the effects of many $+\phi_s$ and $-\phi_s$ bias point shifts during one sampling of the detected energy at frequencies $\omega_d$ and $2\omega_d$.

Equations (6) and (7) show that to maintain quadrature bias operation in the presence of a large square-wave signal (with exactly 100% modulation depth—i.e., $\phi_s=\pi V_{peak}/V_\pi=\pi/2$, or 90°) requires continually feeding back to the modulator a correction voltage that minimizes the detected fundamental of the dither signal frequency (because sin 90°=1 and cos 90°=0). This surprising conclusion is at odds with the prior art approaches described above (and in FIG. 4) in which the second harmonic of the dither signal is minimized to maintain quadrature without a large signal present.

Figure 10:
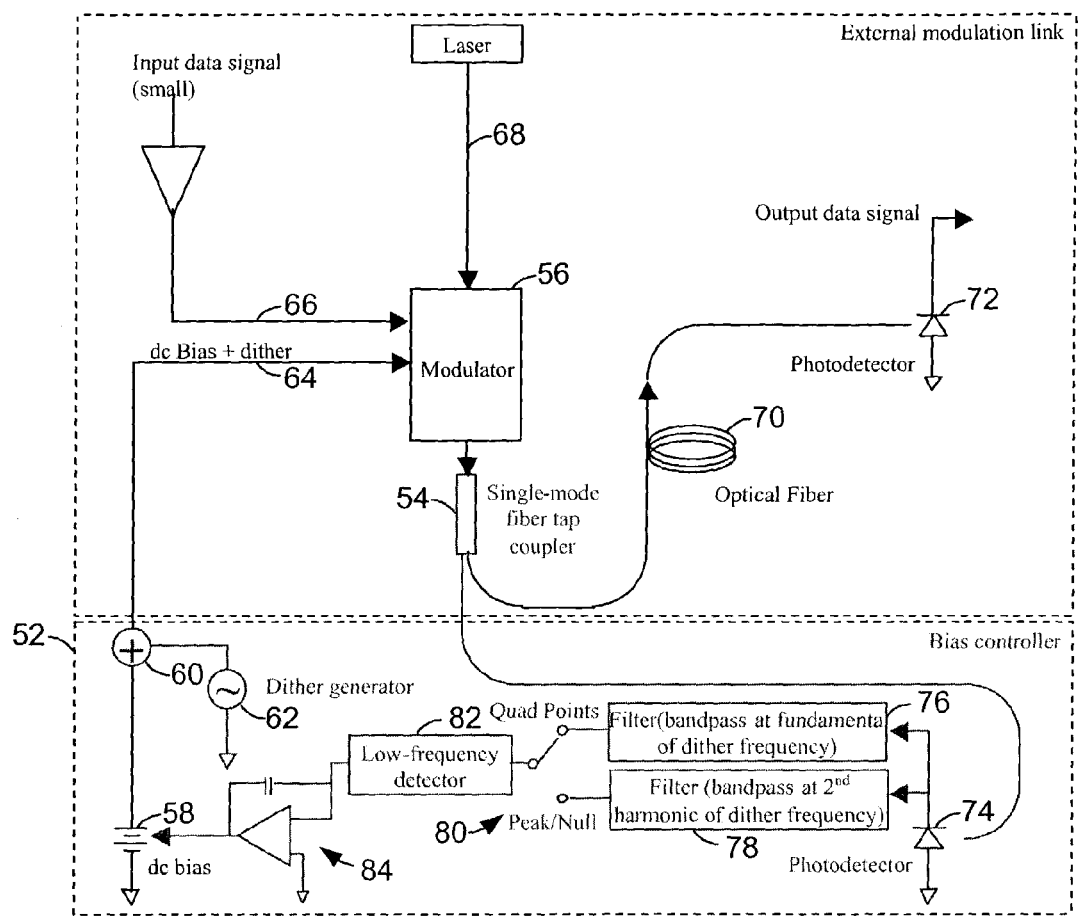
FIG. 10 is a block diagram of a second embodiment of a modulation bias control system according to the invention.

This new theory suggests that there is a simple modification of the present controller that will permit it to be used with large data signals. The modification is shown in FIG. 10, which is similar to FIG. 4, except that the bias points corresponding to the switch settings have been interchanged. Thus perhaps the most powerful aspect of the new theory is that it permits extending the use of present controllers to the large signal case, with relatively simple steps, such as relabeling and/or rewiring them.

Specifically, an alternative modulation bias control system 50 according to one aspect of the invention can include a bias controller 52 having an input operatively connected to one of the outputs of a single-mode fiber tap coupler 54 at the output of a modulator 56. The bias controller also has an output operatively connected to an adjustable DC bias source 58. An output of the bias source is operatively connected to a first input of a summer 60, which also has a second input operatively connected to an output of a dither generator 62. An output 64 of the adder is operatively connected to a bias input of the modulator, which also has an input operatively connected to an amplified data signal input 66 and an output of a source of optical energy 68, such as a laser. The second output of the coupler can be operatively connected via a communications channel 70, such as an optical fiber, to a remote destination 72, such as a remote photodetector. Alternatively, a photodetector 74 can be inserted directly onto the modulator 56, thereby eliminating the need for a separate tap 54.

The bias controller can include the photodetector 74, followed by a first filter 76, such as a bandpass filter at the fundamental of a dither frequency of the dither generator. Also following the photodetector is a second filter 78, such as a bandpass filter at the second harmonic of the dither frequency. A single-pole double-throw (SPDT) switch 80 has a first of its input ports operatively connected to an output of the first filter and a second of its input ports operatively connected to an output of the second filter. The switch is preferably labeled with indicia that indicate which switch positions correspond to the different bias points.

A DC output of a detector 82 can provide a signal proportional to the magnitude of the filtered signal and be operatively connected to the common output port of the switch, and has an output operatively connected to an input of an integrator 84. The integrator has an output operatively connected to the adjustable DC bias source. If only one bias point is required, the bias controller need only include the circuitry required for that bias point.

This approach to modulator bias control is additive in nature, instead of being multiplicative like prior art techniques that control in the presence of large modulation signals (such as, for instance, the prior art method shown in FIG. 5), yet it allows for high modulation depths. The modulator control can exhibit increased stability with increased modulation depth, and work optimally when the modulation depth is 100%. This additive approach can be accomplished by adding, or subtracting some or all of the dither signal to the data signal or by injecting a positive or negative version of some or all of the two signals into different inputs of the modulator. The monitored signal that forms the basis for controlling the bias point can be an even order distortion product of the dither signal for a minimum or maximum operating point, or an odd order distortion product of the dither signal for a quadrature operating point.

Table 1 compares the ranges of modulation signal amplitudes over which three different bias control methods have been experimentally demonstrated to successfully "lock" on the quadrature bias point of an MZ modulator. The dither-based method taught above, wherein the fundamental of the dither was minimized using the invention shown in FIG. 10, resulting in maintainance of a quadrature bias point when the peak-to-peak voltage amplitude of the modulating signal was equal to the modulator's $V_\pi$. It is noted that this is in contrast to the prior art controller of FIG. 4, in which a quadrature bias point could be maintained only when the peak-to-peak voltage amplitude of the modulating signal was much less than the modulator's $V_\pi$. By comparison, the dither-free bias control method shown in FIG. 6 has been experimentally demonstrated to maintain a lock on the quadrature bias point even as the peak-to-peak voltage amplitude was varied over a range of 0.5 $V_\pi$ to 1.3 $V_\pi$.

TABLE 1

| Modulator Bias Control Method | Observed Range of Signal Amplitudes that Permit "Lock" at Quadrature Bias Point |
| --- | --- |
| Dither-Based Methods | |
| Minimizing Dither Fundamental (FIG. 10) | Vpk-pk = $V_\pi$ |
| Minimizing Dither 2nd Harmonic (Prior Art) | Vpk-pk << $V_\pi$ |
| Dither-Free Method (FIG. 6) | 0.5 $V_\pi$ ≦ Vpk-pk ≦ 1.3 $V_\pi$ |

Figure 11:
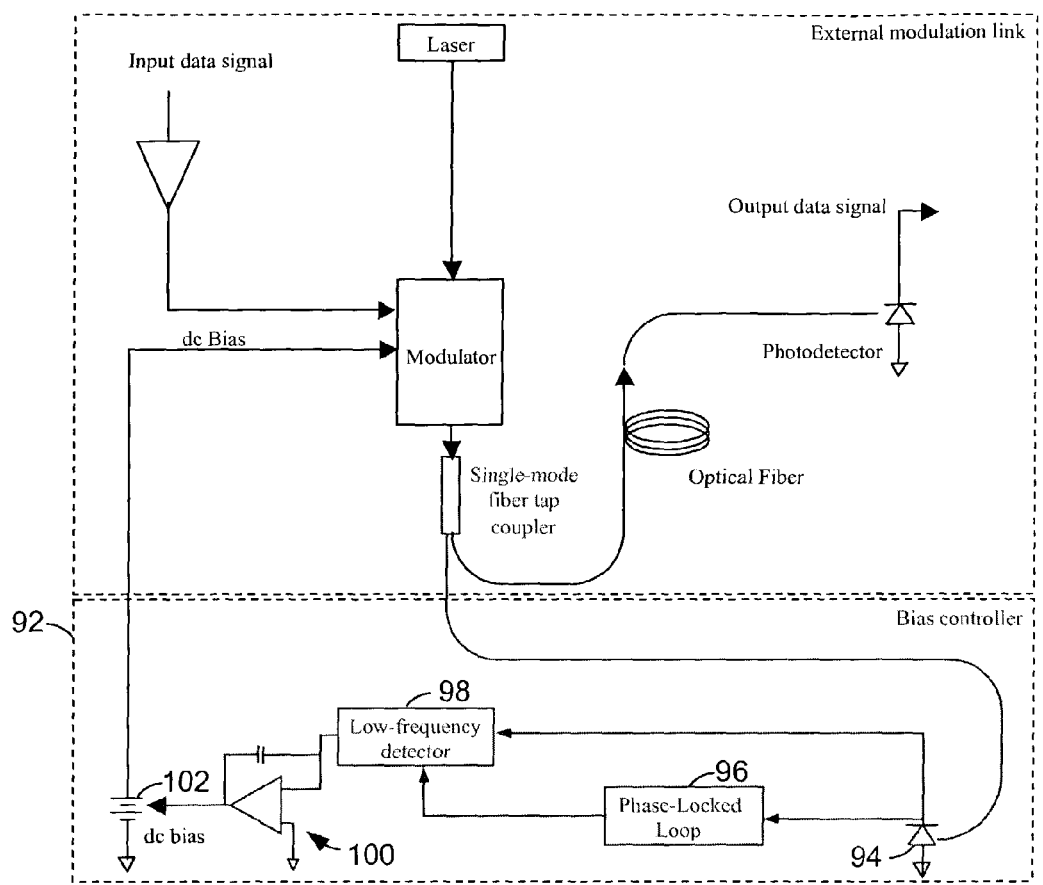
FIG. 11 is a block diagram of a third embodiment of a modulation bias control system according to the invention.

Referring to FIG. 11, it is also possible to construct a bias controller that selects an individual frequency or set of frequencies within the portion of the spectrum 100-1000 times lower than the bit rate to use as an "ersatz dither," and then use a conventional feedback circuit to maintain the modulator's bias point such that the amplitude of this ersatz dither frequency or set of frequencies is maximized or such that the amplitude of the second harmonics of these frequencies is minimized. A system of this type 90 includes a controller 92 with a photodetector 94 having one output operatively connected to a first input of a phase-locked lop 96 that filters out a very narrow portion of the low-frequency spectral components of the digital data signal to act as the ersatz dither, and a second output connected to the input of a low-frequency detector 98. The low-frequency detector also includes a second input operatively connected to an output of the phase-locked loop, and an output operatively connected to an input of an integrator 100. The integrator has an output operatively connected to a DC bias source 102.

Figure 12:
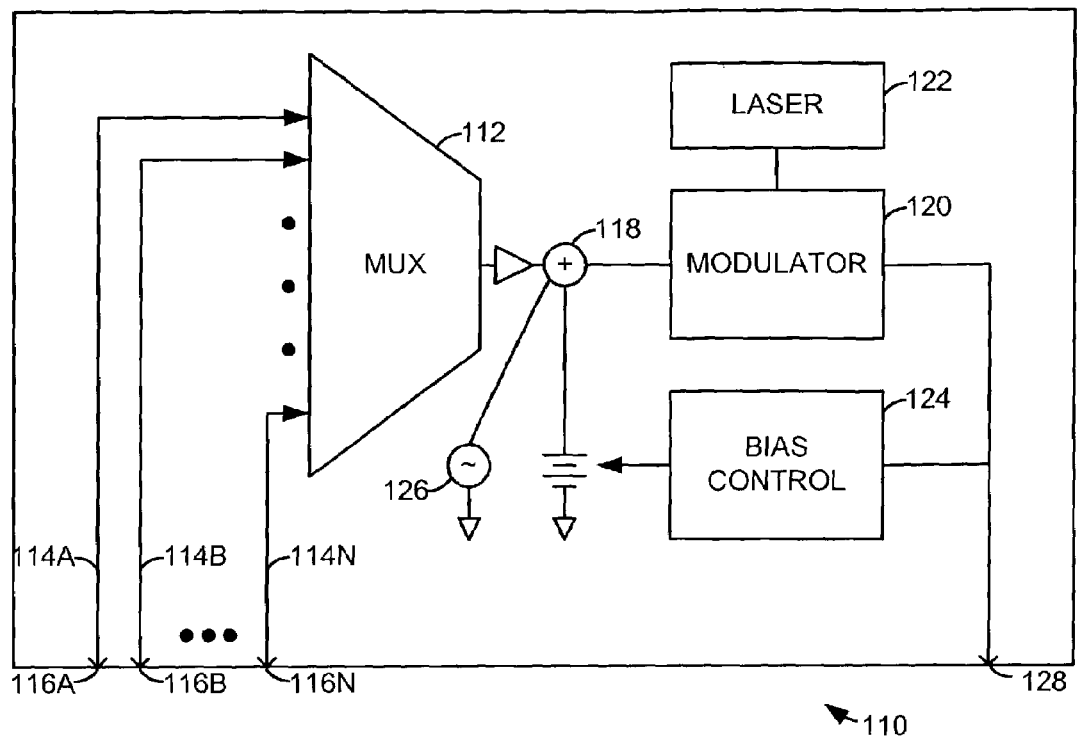
FIG. 12 is a block diagram of telecommunication interface module according to the invention.

Referring to FIG. 12, modulation bias controllers according to the invention can be used in network interface applications. A network interface 110, such as a line card, can include a multiplexer (MUX) 112 that has a number of data inputs 114A, 114B, . . . 114N received from a series of interface inputs 116A, 116B, . . . 116N (e.g., connector contacts). An output of the multiplexer is operatively connected to a first input of a summer 118, which also has a second input that is operatively connected to an output of a dither generator 126. An output of the summer is operatively connected to an input of a modulator 120 that modulates a source of optical energy 122, such as a laser. A bias control circuit 124 receives part of the output of the modulator and makes adjustments to a bias input of the modulator through a third input of the summer. The modulator output is operatively connected to an optical output 128. The modulator can be operatively connected to the optical output via a single-mode optical fiber. The optical output can be implemented with an optical connector, such as an FC, SC, or EC-type connector. In one embodiment, the network interface is a modular line card, such as a VME line card.

The dither signal is preferably a low-frequency, low amplitude, periodic signal. The dither signal should preferably have a lower frequency than any fully recoverable frequency component of the data. In one embodiment the dither signal is a 3 kHz sine wave with a peak-to-peak amplitude that is less than about 25% of the peak-to-peak amplitude of the data input signal, but in optical communication applications, it may be appropriate to use a 50 kHz or even a 100 kHz signal. These are preferred characteristics, however, and other types of dither signals may be appropriate in particular circumstances.

The present invention has now been described in connection with a number of specific embodiments thereof. However, numerous modifications which are contemplated as falling within the scope of the present invention should now be apparent to those skilled in the art. It is therefore intended that the scope of the present invention be limited only by the scope of the claims appended hereto. In addition, the order of presentation of the claims should not be construed to limit the scope of any particular term in the claims.

What is claimed is:

1. A bias method for an optical modulator that is operative to modulate an optical carrier with a received data input signal to produce a modulated optical output signal, comprising the steps of:
   receiving the modulated optical output signal from the optical modulator,
   detecting from the modulated optical output signal received in the step of receiving a characteristic of the data input signal, and
   adjusting an electrical bias input signal provided to the modulator based primarily on the characteristic of the data input signal detected from the modulated optical output signal in the step of detecting.

2. The method of claim 1 wherein the step of adjusting maximizes a magnitude derived from the modulated optical output signal for a quadrature operating point.

3. The method of claim 1 wherein the step of adjusting minimizes a magnitude derived from the modulated optical output signal for a minimum or maximum operating point.

4. The method of claim 1 wherein the step of detecting is operative to detect magnitude within a predetermined spectral range.

5. The method of claim 4 wherein the step of detecting is operative to detect a magnitude of low frequency components in the modulated optical output signal that correspond to the data input signal.

6. The method of claim 1 wherein the step of detecting performs peak detection.

7. The method of claim 1 wherein the step of detecting performs peak-to-peak detection.

8. The method of claim 1 wherein the step of detecting performs RMS detection.

9. The method of claim 1 wherein the step of detecting performs envelope detection.

10. The method of claim 1 wherein the step of detecting performs square-law detection.

11. The method of claim 1 further including the steps of transmitting the modulated optical output signal through an optical medium, and demodulating the transmitted modulated optical output signal to extract the data input signal.

12. The method of claim 11 wherein the step of receiving receives the modulated optical output signal in optical form.

13. The method of claim 1 wherein the step of detecting includes a step of filtering.

14. The method of claim 13 wherein the step of filtering includes a step of low-pass filtering.

15. The method of claim 1 wherein the step of detecting includes locking onto the phase of a frequency component of the input data signal.

16. The method of claim 1 wherein the step of adjusting includes performing a series of processor instructions.

17. The method of claim 1 wherein the step of adjusting adjusts a voltage.

18. The method of claim 1 wherein the step of adjusting performs its adjustment to maximize the characteristic of the input data signal.

19. The method of claim 1 wherein the step of receiving receives the modulated optical output signal directly through an optical splitter.

20. The method of claim 1 further including the step of applying an input standby signal to an input of the modulator in the absence of the data input signal,
 receiving the modulated optical output signal from the optical modulator in the absence of the data input signal,
 detecting in the absence of the data input signal and from the modulated optical output signal received in the step of receiving in the absence of the data input signal a characteristic of the received data input signal, and
 adjusting the electrical bias data input signal provided to the modulator based on the characteristic of the data input signal detected from the modulated optical output signal in the step of detecting in the absence of the data input signal.

21. The method of claim 1 wherein the step of receiving receives a characteristic of an input signal having a modulation depth of on the order of at least 90%.

22. A modulator bias controller for a modulator having a data input, a data output, and a bias input, comprising:
 a data signal detector responsive to the data output of the modulator and primarily operative to detect a characteristic of a data input signal present at the data input from a data output signal at the data output, and
 a controller having an input responsive to an output of the data signal detector and an output, and wherein the controller is operative to produce a control signal on the output that is dependent on a signal received from the data signal detector through the input of the controller to provide a bias signal to the bias input of the modulator.

23. The apparatus of claim 22 wherein the control output is a bias voltage output operative to provide a bias voltage to the bias input of the modulator.

24. The apparatus of claim 22 wherein the data signal detector includes a filter.

25. The apparatus of claim 22 wherein the data signal detector includes a low-pass filter.

26. The apparatus of claim 22 wherein the data signal detector includes a phase-locked loop.

27. The apparatus of claim 22 wherein the controller includes a processor.

28. The apparatus of claim 22 wherein the controller has a maximizing transfer function that is operative to maximize the characteristic of the input data signal detected in the output data signal.

29. The apparatus of claim 22 further including a sweep generator having an output operatively connected to the input of the modulator.

30. A modulator bias controller for a modulator having a data input, a data output, and a bias input, comprising:
 means for receiving a modulated optical output signal from the modulator,
 means responsive to the means for receiving for detecting from the modulated optical output signal received by the means for receiving a characteristic of a data input signal received at the data input, and
 means responsive to the means for detecting for adjusting an electrical bias input signal provided to the modulator based primarily on the characteristic of the data input signal detected from the modulated optical output signal by the means for detecting.

31. The method of claim 1 wherein the step of adjusting operates independently of any dither injected in the modulator.

32. The apparatus of claim 22 wherein the controller operates independently of any dither injected in the modulator.

33. The apparatus of claim 30 wherein the means for adjusting operates independently of any dither injected in the modulator.

* * * * *